United States Patent [19]

Herolf

[11] Patent Number: 4,881,865
[45] Date of Patent: Nov. 21, 1989

[54] FOREST MACHINE WITH CRANE

[75] Inventor: Olof Herolf, Sundsvall, Sweden

[73] Assignee: OSA AB, Alfta, Sweden

[21] Appl. No.: 149,226

[22] PCT Filed: Jun. 9, 1987

[86] PCT No.: PCT/SE87/00271

§ 371 Date: Apr. 7, 1988

§ 102(e) Date: Apr. 7, 1988

[87] PCT Pub. No.: WO87/07474

PCT Pub. Date: Dec. 17, 1987

[30] Foreign Application Priority Data

Jun. 12, 1986 [SE] Sweden .............................. 8602629-1

[51] Int. Cl.$^4$ ......................... A01G 23/08; B60P 1/54
[52] U.S. Cl. .................................. 414/550; 144/3 D; 144/34 R; 144/336; 414/555; 414/728; 414/729
[58] Field of Search ............... 414/546, 547, 550, 555, 414/543, 687, 718, 728, 729, 914; 212/180, 281, 223, 244, 254, 188, 231; 144/2 Z, 3 D, 34 R, 34 E, 335, 336

[56] References Cited

U.S. PATENT DOCUMENTS

| | | | |
|---|---|---|---|
| 1,909,528 | 5/1933 | Garson | 212/244 |
| 2,746,612 | 5/1956 | Wirz | 212/244 X |
| 3,109,541 | 11/1963 | Matson | 212/231 X |
| 3,263,834 | 8/1966 | Tendresse | 414/555 X |
| 3,265,219 | 8/1966 | Sundin | 212/188 |
| 3,491,811 | 1/1970 | Larson et al. | 144/30 D X |
| 3,586,078 | 6/1971 | Hamilton et al. | 414/555 X |
| 3,601,169 | 8/1971 | Hamilton et al. | 414/550 X |
| 4,540,032 | 9/1985 | Pelletier et al. | 144/2 Z X |
| 4,565,486 | 1/1986 | Crawford et al. | 144/34 E X |
| 4,643,320 | 2/1987 | Larsen | 212/180 |
| 4,653,555 | 3/1987 | Mellgren | 144/30 D |

FOREIGN PATENT DOCUMENTS

| | | |
|---|---|---|
| 2479124 | 10/1981 | France . |
| 205129 | 6/1966 | Sweden . |
| 227227 | 4/1968 | Sweden .............................. 414/550 |
| 347472 | 3/1969 | Sweden . |
| 385099 | 3/1971 | Sweden . |
| 402554 | 4/1978 | Sweden .............................. 414/550 |
| 86001203 | 1/1986 | Sweden . |
| 86001211 | 1/1986 | Sweden . |
| 86001237 | 7/1987 | Sweden . |
| 655360 | 4/1979 | U.S.S.R. .............................. 144/34 R |

OTHER PUBLICATIONS

Derwents Abstract No. A 8862 D-05, SU 736 908, Aug. 1974.

Derwents Abstract No. 84-099509-16, SU 1028284, Jul. 1983.

Derwents Abstract No. C 5858 B-12, SU 604540, Apr. 1978.

Derwents Abstract No. M 5138 E-38, SU 880353, Nov. 1981.

*Primary Examiner*—David A. Bucci
*Attorney, Agent, or Firm*—McFadden, Fincham, Marcus & Allen

[57] ABSTRACT

A forest machine with a crane comprises a driver's cab (2) which is mounted on a wheeled chassis (1) and behind which a load carrier (3) is placed, and a crane post (10) mounted in association with the cab and rotatable relative to the chassis and carrying an outer boom (11) having a telescopic boom (16) which is arranged at its free end to carry a working tool (21). The crane post (10) comprises two suitably inclined, spaced-apart support arms (12) between which extends a pivot shaft (13) on which the outer boom is mounted in a position between the support arms. The pivot shaft (13) is located at a distance from the center of rotation of the post (10) exceeding half the distance between a pair of wheels carrying the chassis of the machine. The outer boom is movable through at least 90° between a horizontal and a vertical position, more precisely by means of a hydraulic cylinder (19).

19 Claims, 3 Drawing Sheets

FOREST MACHINE WITH CRANE

TECHNICAL FIELD OF THE INVENTION

This invention relates to a forest machine having a crane and being of the type comprising a driver's cab which is mounted on a wheeled chassis and behind which a load carrier is disposed, and a crane post mounted in association with said cab and rotatable relative to the chassis and carrying an outer boom having a telescopic or extension boom movable backwards and forwards and adapted at its free end or tip to carry a working tool, such as a grapple, a harvester assembly, a loading hook or the like.

BACKGROUND OF THE INVENTION

Hitherto known cranes in forest machines of the above-described type normally comprise not only a crane post and an outer boom, but also a first boom section which is mounted therebetween and the movements of which are adjusted by means of at least one hydraulic cylinder. This means that it is difficult to maneuver such cranes when operating in forest stands where it is desirable in as short a time as possible to seize and/or process the trees and place them on the load carrier of the machine, since the operator must pay attention not only to such functions as the rotation of the crane post, pivotal movement of the outer boom and telescopic movement of the extension boom in relation to the outer boom, but also to the movements of the first boom section in relation to the crane post as well as the cooperation of the first boom section with the outer boom. Another shortcoming inherent in prior art cranes of the above type is that they are of a complicated and, thus, expensive design.

BRIEF ACCOUNT OF THE INVENTIVE CONCEPT

The present invention aims at overcoming the above-mentioned drawbacks by providing a crane which is designed especially for forest machines, such as forwarders or harvesters, and which is easy to operate in a quick and convenient way and is of a simple and inexpensive design while being robust and capable of handling heavy loads within a substantial, optimal area of operation. According to the invention, these and other objects are achieved by a forest machine which is characterized in that the crane post comprises two suitably inclined, spaced-apart support arms between which a shaft extends which serves as a pivot and on which the outer boom is mounted in a position between, preferably midway between said arms, that said shaft is located at a distance from the centre of rotation of said post exceeding half the distance between a pair of front wheels carrying the chassis of the machine, and that the outer boom is movable through at least 90° between a substantially horizontal position and a substantially vertical position, more precisely by means of at least one power mechanism, particularly a hydraulic cylinder, whereby the boom tip is movable not only within an area substantially completely covering the volume of the load carrier, but also to positions close to both sides and the front of the cab as well as the ground surrounding the machine.

U.S. patent specification No. 3,265,219 describes a crane which is intended for a truck and which, in addition to a rotatable frame in the form of a post and a first boom section which is pivotal in relation to the post, comprises an outer boom which is pivotal to a limited extent relative to the first boom section and which is articulated in a point located outside or at the side of the wheels of the vehicle. In this construction, the outer boom is however laterally offset with respect to the first boom section so as to be capable, when moved to a parking position, of moving beside both the first boom section and the post. In practice, this laterally offset location of the outer boom relative to the first boom section means that the crane is ill-suited for handling such heavy loads as trees, since in such a case extremely large torques are applied to the crane in the area between the outer boom and the first boom section. Further, the known crane has a limited range of operation. For instance, the working tool employed cannot be placed in front of the driver's cab.

BRIEF DESCRIPTION OF THE ACCOMPANYING DRAWINGS

In the drawings,

FIG. 1 is a schematic side view of a forest machine having a crane designed in accordance with the invention, FIG. 2 is a schematic top plan view of the machine or vehicle, FIG. 3 is a simplified perspective view illustrating one embodiment of the crane on a larger scale, FIG. 4 is an end view from in front of the forest machine in FIG. 1, and FIG. 5 is a partial side view showing an alternative embodiment of the invention.

DETAILED DESCRIPTION OF PREFERRED EMBODIMENTS OF THE INVENTION

Figure 1:
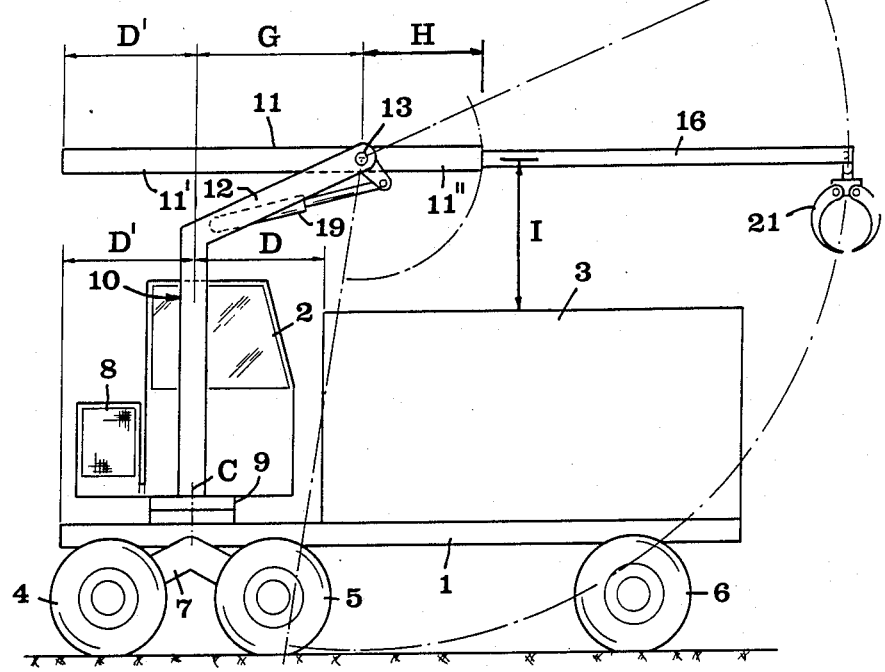
Figure 2:
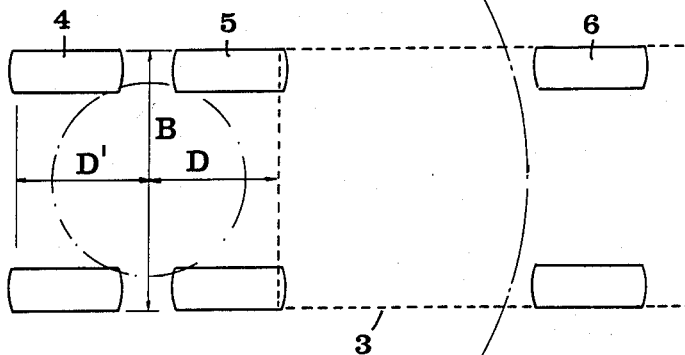

In FIGS. 1 and 2, numeral 1 generally designates the chassis or frame of a forest machine in the form of a forwarder having a driver's cab 2 and a load carrier or bin 3 disposed behind the cab. In the illustrated example, the chassis 1 is carried on three pairs of wheels 4, 5, 6 of which two front wheels 4, 5 located on the same side are mounted on common yokes 7, thus forming bogies which are individually pivotable relative to the chassis in the manner disclosed in SE patent application 8600123-7. The vehicle may also in other respects regarding chassis, wheel suspensions and load carrier be devised in the manner disclosed in said patent application. Especially, it may be provided with double-pivot steering in that the two rear wheels 6 are pendulum-suspended in relation to the chassis and pivotal in relation to the swing arms employed.

The cab 2, together with an associated drive unit 8, is rotatable relative to the chassis 1 by means of a gear rim 9 or the like. Suitably, the cab is rotatable one revolution or at least approximately 360°, such that the front window of the cab can be oriented in any desired angular position relative to the centre of rotation designated C in FIG. 1. In this context, it should also be noted that the dimensions of the cab and the drive unit are such that—regardless of their angular position—they will never project appreciably from the base surface defined, on the one hand, by the width of the vehicle (i.e., the distance between the outer sides of opposite wheels) and, on the other hand, by the distance between the front end of the load carrier 3 and the front portion of the chassis 1.

Figure 3:
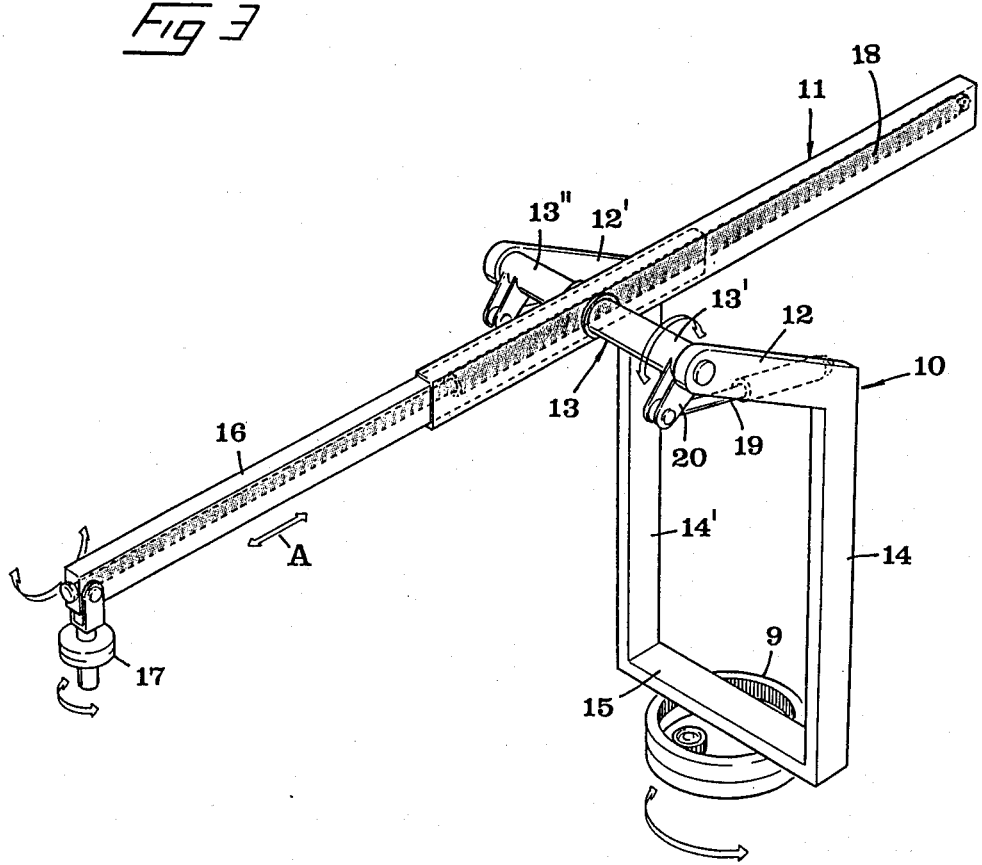

The cab 2 is associated with a crane post, generally designated 10, which carries an outer boom 11. As best seen in FIG. 3, the post 10 comprises two spaced-apart, suitably parallel support arms 12, 12' between which there extends a shaft generally designated 13 on which the outer boom 11 is mounted. In the illustrated embodiment, the support arms 12, 12' are connected with side members 14, 14' which, together with a base member 15, form a frame which encloses the cab and is rotatable together therewith by means of the gear rim 9. In other words, the crane post 10 is also rotatable relative to the above-mentioned axis of rotation C, suitably one revolution or approximately 360°. The side members 14, 14' also serve as a safety frame for the cab 2.

The outer boom 11 also includes at least one further boom or extension boom 16 which is movable backwards and forwards relative to the outer boom 11 for moving a tool attachment 17 towards and away from the shaft 13 (see arrow A). In the embodiment illustrated in the drawing, the boom 16 is a box section inserted in a slightly larger box section forming the outer boom 11. The boom 16 is telescopically movable in the boom 11 by means of a double-acting piston and cylinder assembly 18 integrated in the two box sections. It should here by emphasized that the illustrated embodiment is only one of several conceivable designs. Thus, the telescoping boom 16 may be replaced by a sliding boom or any other construction which is adapted, in the manner described above, to move the tool attachment 17 towards and away from the shaft 13. It is also conceivable to use a plurality of booms telescopically mounted in each other, for instance when it is desired to have a crane with an extremely large range of operation.

In the illustrated embodiment, the pivot shaft 13 comprises two halves or sections 13', 13" each of which is rigidly connected at one end to the outer boom or box section 11 and rotatably mounted at their opposite end relative to the associated support arm. In practice, the shaft sections 13', 13" may consist of tubes welded to the box section and mounted on rod members fixedly connected to the support arms. For pivoting the outer boom 11, there is provided in this embodiment, on each side of the boom a double-acting hydraulic cylinder 19 which at one end is suitably articulated to the associated support arm 12 at the rear end thereof, while the opposite end, here the free end of the piston rod, is articulated to a lug 20. In the state shown in FIG. 3 where the outer boom 11 is in a horizontal position, the lug 20 is directed obliquely downwardly-forwardly from the centre of the shaft. Thus, the outer boom can be pivoted within a very large angular range by means of a relatively short hydraulic cylinder.

Figure 4:
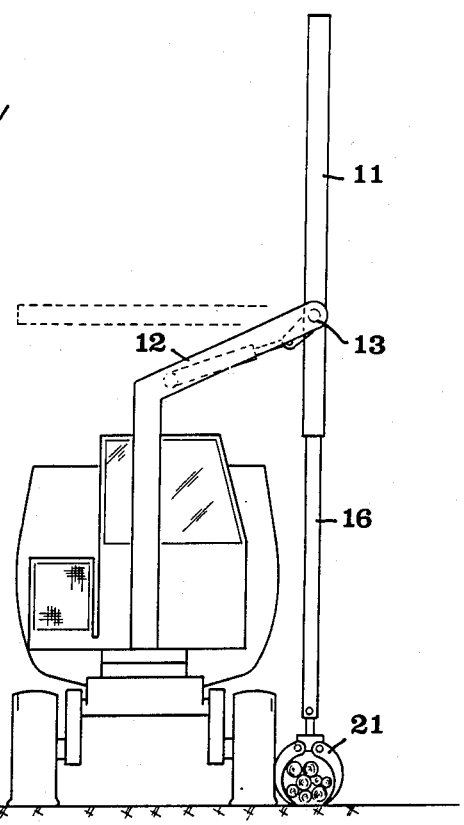

Reference is again made to FIG. 1 from which it appears that the portion 11' of the outer boom 11 located behind the pivot shaft 13 is substantially longer than the outer boom portion 11" extending forwardly of the pivot shaft. In practice, the portion 11' may be 2-3, suitably about 2.5 times longer than the portion 11". From FIG. 1 further appears that the distance G between the centre of rotation C of the crane post and the pivot shaft 13 exceeds the distance D between said centre of rotation and the front end or end wall of the load carrier 3. The distance D essentially corresponds to the distance D' between the centre of rotation of the crane post and the front end of the chassis 1, the distance (D+D') between the front end wall of the load carrier and the front end of the chassis 1 essentially corresponding to the width B of the vehicle (counted as the distance between the outer sides of opposite wheels). By this geometry, it is ensured that the shaft 13, as shown in FIG. 1, will be located in the area behind the front end wall of the load carrier when the crane post is rotated straight backwards relative to its centre of rotation. As further appears from FIG. 4, the shaft 13 is located outwardly of the outer side of the wheels when the post is swung sideways from the vehicle. Similarly, the pivot shaft will be located in the area in front of the forward end of the chassis 1 when the post is swung straight forwards relative to its centre of rotation. As clearly appears from FIG. 4, a grapple 21, mounted in the tool attachment of the extension boom 16, may thus be located very close to the vehicle when the outer boom 11 is pivoted to a vertical position. In this position, the grapple can also reach as far as the ground. Similarly, the grapple may of course also be located at ground level just in front of the chassis.

As appears from FIG. 1, the support arms 12 extend obliquely in relation to the horizontal plane, such that the shaft 13 will be at a certain distance above the cab 2. In practice, the support arms may be inclined about 20°-30°, suitably about 25°, in relation to the horizontal plane, whereby the outer boom can be pivoted upwards a considerable distance in the anticlockwise direction from the horizontal position indicated in full lines, more precisely suitably about 15°-30° from this position. As further appears from the sweep curve shown in dash-dot lines, the outer boom can be pivoted downwards not only through 90° from the horizontal position indicated in full lines, to a substantially vertical position but through a further distance of at least about 5°-10°. From FIG. 1 further appears that the length H of the front portion 11" of the outer boom is considerably less than the distance I between the shaft 13 and the top of the load carrier 3.

It appears from the foregoing that the grapple 21, by adjustment of the pivotal movement of the outer boom and the position of displacement of the extension boom 16 relative to the outer boom, can reach practically any point within the load carrier 3, the grapple being laterally positioned by rotating the crane post 10 about its centre of rotation.

Figure 5:
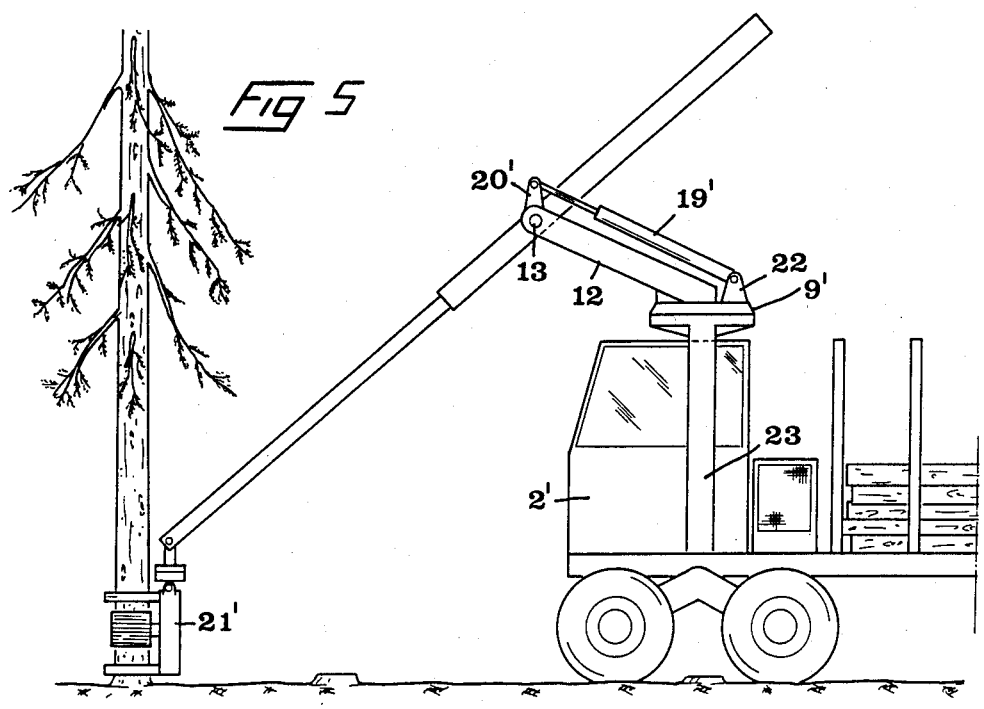

The embodiment illustrated in FIG. 5 differs from the previously described embodiment only in that the grapple has been replaced by a harvester or processor assembly 21'. Also, the support arms 12 forming the crane post are mounted on a gear rim or the like 9' disposed on top of the cab 2' which in this case is fixedly mounted on the vehicle chassis. It should also be noted that the lugs 20' for the hydraulic cylinders 19' are directed upwards from the pivot shaft 13, the hydraulic cylinders being connected at their rear ends to upwardly projecting attachments 22 by means of which the cylinders are located at a certain distance above and substantially parallel to the support arms. In this case, too, the crane post comprises two side members 23 enclosing the cab and serving as a safety frame therefor. In this instance, the safety frame is however not directly connected to the support arms 12 but carries the gear rim 9' in turn carrying the support arms.

ADVANTAGES OF THE INVENTION

The crane design described above is very easy and inexpensive to manufacture, primarily since it includes but a single articulation, i.e. the pivot shaft 13 for pivoting the outer boom. This feature makes it extremely easy for the operator to maneuver the crane because only three functions need be observed, viz.:

(a) rotation of the post 10 about the centre of rotation C,
(b) pivotment of the outer boom 11 upwards or downwards, and
(c) displacement of the extension boom 16 out of or into the outer boom 11.

When the tool attachment or extension boom tip is being moved to different spatial points, all movements are at right angles or parallel to the boom tip. While the crane is of a simple design, it has a relatively large range of operation and a substantial flexibility in that the boom tip can reach not only practically any point in the load carrier but also any point in the immediate vicinity of the outer side of the vehicle and of the ground. Thanks to the suitably centric location of the outer boom between two support arms, there is obtained a robust crane capable of handling heavy loads without the need of any oversized constructional elements. The fact that the major part of the outer boom 11 (portion 11') is located behind the shaft 13 further means that this part will serve as a counterweight for the extension boom 16 and, hence, the pivotal movements of the outer boom can be executed very smoothly. It should also be pointed out that the crane may easily be automated and also may be placed both in front of the cab and behind it on the load carrier. Further, it should be noted that the working conditions of the driver are essentially improved ergonomically when the cab is rotatable together with the crane, as shown in the embodiment of FIGS. 1–4. In this case, the driver seldom or never need execute tiring twisting and turning movements of the body, especially of the head, when maneuvering the crane, which is of substantial physiological importance during continuous long-term operations. Using parts of the crane post as safety frame for the cab further means that the cab can be manufactured cheaply. Finally, it should be pointed out that the driver, when maneuvering the crane, may pay full attention to the position of the working tool and need not bother about how the other parts of the crane affect the forest stand since the rear portions of the outer boom are always within the base area of the cab irrespective of the position of rotation of the crane.

POSSIBLE MODIFICATIONS OF THE INVENTION

It goes without saying that the invention is not restricted only to the embodiments described above and illustrated in the drawings. Thus, it is conceivable, for instance, to use a single hydraulic cylinder, instead of two such cylinders, for pivoting the outer boom. Further, the design of the crane post may be varied in several different ways. For instance, the pivot shaft 13 may extend through the outer boom 11, in which case the extension boom 16 moves in a plane separate from that of the shaft. Also, it is conceivable to arrange the support arms 12 such that they can be adjusted to different working positions in respect of their inclination relative to the horizontal plane, e.g. for temporarily reducing the overall height of the vehicle, thus making it possible to run the vehicle under viaducts or the like.

As to the sweep curve shown in FIG. 1, it should be pointed out that it relates to the tip of the crane boom or the free end of the extension boom 16. In practice, the actual reach of the crane will of course increase by the length of the working tool 21 and 21' connected to the boom. This also applies to the working area surrounding the forest machine, which is indicated in FIG. 2 by a circle K.

I claim:

1. A crane-type forest machine comprising a crane and a wheeled chassis having width, length and depth dimensions, sides and a front, the chassis having at least a pair of opposed, spaced apart front wheels, a driver's cab mounted on said wheeled chassis over said front wheels; a load carrier having a length disposed behind said cab and on the chassis; a rotatable crane post mounted for rotation about a vertical axis, relative to said chassis; said crane post comprising a pair of spaced apart upwardly extending arms, one on each side of the cab, each of said arms including an inclined end portion, said end portions extending in spaced apart relationship; a rotatable shaft extending transversely between said inclined end portions and being rotatable about a horizontal axis; means for rotating said shaft about said horizontal axis; said shaft being spaced above and positioned a distance from said vertical axis greater than the minimum distance from said vertical axis to the sides and front of said chassis; a boom mounted intermediate its ends on said shaft whereby said boom is rotatable about said horizontal axis; an extension boom associated with said boom; and means for extending and retracting said extension boom; whereby said arms can be pivoted about said vertical axis and said boom pivoted about said horizontal axis to extend vertically at any position along said sides and front of the chassis to reach the ground level at the sides and front of the chassis.

2. A forest machine as claimed in claim 1, characterized in that said crane post is connected to said cab and is rotatable therewith relative to said chassis.

3. A forest machine as defined in claim 2, wherein said crane post and cab are rotatable through 360°.

4. A forest machine as claimed in claim 1, wherein said inclined end portions form an extension of said arms.

5. A forest machine as claimed in claim 1 wherein said extension boom is a telescopic boom.

6. A forest machine as claimed in claim 1 wherein said extension boom has a free end adapted to mount a working tool selected from the group consisting of a grapple, a processor assembly and a loading hook.

7. A forest machine as claimed in claim 1 wherein said boom is mounted midway between said inclined end portions.

8. A forest machine as claimed in claim 1 wherein said means for rotating said shaft comprises a hydraulic cylinder.

9. A forest machine as claimed in claim 1, wherein said arms are arranged on both sides of said cab and form a safety frame therefor.

10. A forest machine as claimed in claim 1, wherein said cab has opposed sides and a front, and wherein the extension boom has a free end movable to a first position within the dimensions of said load carrier, and to a second position in areas adjacent said opposed sides and said front of said driver's cab, and to a third position close to a substrate upon which said forest machine is being operated.

11. A forest machine as claimed in claim 1, wherein said boom has a rear portion and a front portion, said rear portion extending rearwardly of said rotatable shaft and has a length which at least substantially corresponds to the length of a distance between said front wheels, said boom having a front portion extending forwardly of said rotatable shaft and having a length less than the length of said rear portion of said boom.

12. A forest machine as claimed in claim 11, wherein said front portion of said boom and said extension boom have a total length at least equal to the length of said load carrier.

13. A forest machine as claimed in claim 11, wherein said load carrier has depth dimensions defined by a top and a bottom of said load carrier, and wherein the length of said front portion of said boom is less than a vertical distance extending between said rotatable shaft and the top of said load carrier.

14. A forest machine as claimed in claim 11, wherein said rotatable shaft comprises a pivot shaft having a pair of sections, each section having opposed ends, one end of each section being rigidly connected to said boom, and the opposed end being rotatably mounted relative to said inclined end portions, said machine further including a double-acting hydraulic cylinder having opposed ends, said double-acting hydraulic cylinder being mounted at one end to each section of said pivot shaft and at the opposed end to said crane post.

15. A forest machine as claimed in claim 14, wherein said double-acting hydraulic cylinder is connected to said shaft sections via a lug whereby when said boom is in a substantially horizontal position, said lug extends obliquely downwardly and forwardly from said pivot shaft, and at said opposed end, said hydraulic cylinder is connected to said crane post via an articulation disposed in said inclined end portions.

16. A forest machine as defined in claim 1 wherein the length of said rear portion of said boom exceeds the length of said distance between said front wheels.

17. A forest machine as defined in claim 12 wherein said total length exceeds the length of said load carrier.

18. A forest machine as defined in claim 12, wherein said total length is at least equal to a vertical distance extending between said rotatable shaft and said substrate.

19. A forest machine as defined in claim 14, wherein said hydraulic cylinder is mounted to said inclined end portions.

* * * * *